United States Patent

Wong et al.

[11] Patent Number: 5,559,317
[45] Date of Patent: Sep. 24, 1996

[54] CARD READER WITH CARRIAGE POWERED BY MOVEMENT OF INSERTED CARD

[75] Inventors: Yiu K. Wong, Scarborough; David H. Groves, Adjala; Martin F. Hemy, Palgrave, all of Canada

[73] Assignee: International Verifact Inc., Toronto, Canada

[21] Appl. No.: 418,302

[22] Filed: Mar. 27, 1995

[51] Int. Cl.$^6$ ........................................ G06K 7/08
[52] U.S. Cl. ................. 235/449; 235/482; 360/101; 360/2
[58] Field of Search .................... 235/479, 482, 235/475, 380, 449; 360/101, 2; 369/177, 68, 63, 31

[56] References Cited

U.S. PATENT DOCUMENTS

| | | |
|---|---|---|
| 3,866,827 | 2/1975 | Obata et al. . |
| 3,940,796 | 2/1976 | Haun et al. . |
| 3,953,887 | 4/1976 | Kobylarz et al. ............................ 360/2 |
| 3,976,858 | 8/1976 | Haun . |
| 4,048,476 | 9/1977 | Lawter et al. . |
| 4,447,898 | 5/1984 | Koike ........................................ 369/31 |
| 4,529,872 | 7/1985 | Dinges ..................................... 235/482 |
| 4,670,643 | 6/1987 | Hain et al. ............................... 235/475 |
| 4,990,758 | 2/1991 | Shibano et al. .......................... 235/479 |

Primary Examiner—John Shepperd
Assistant Examiner—Mark Tremblay

[57] ABSTRACT

A card reader stores the energy imparted by a user inserting a card into a slot. When the card is fully inserted, a release mechanism is triggered and the stored energy moves a read head over a coded stripe. In the preferred embodiment, a torsion spring mounted on a carriage winds about an axle. The axle has a gear at one end which engages a rack fixed on the base of the reader. The gear and axle rotate as the carriage is moved relative to the reader, thereby winding the torsion spring and storing energy. A set of ratchet teeth mounted on the base prevents the return of the carriage before the card is fully inserted into the slot. The reader can also accommodate reading and writing to smart cards.

23 Claims, 7 Drawing Sheets

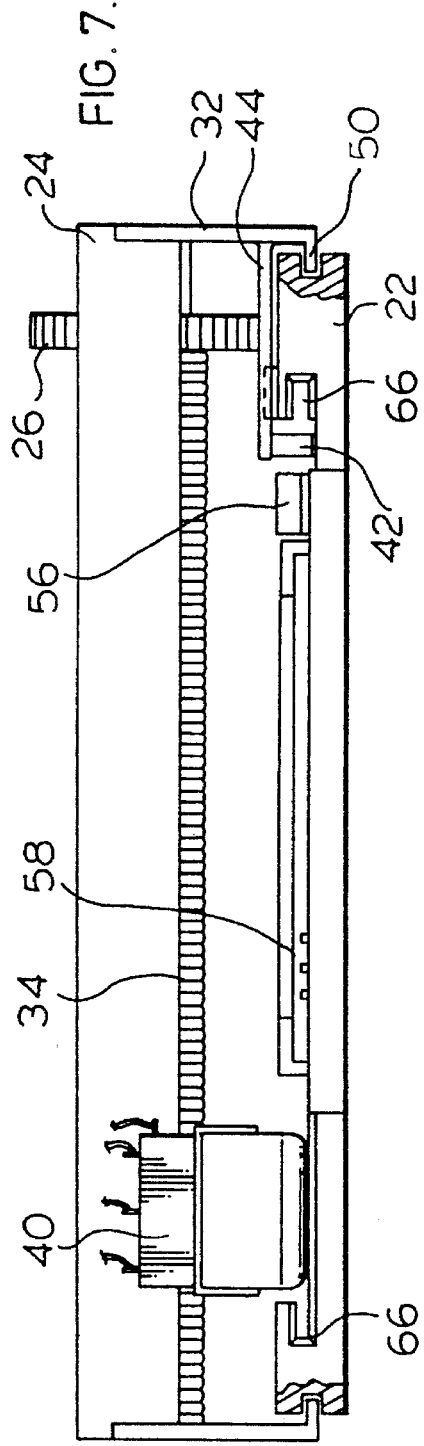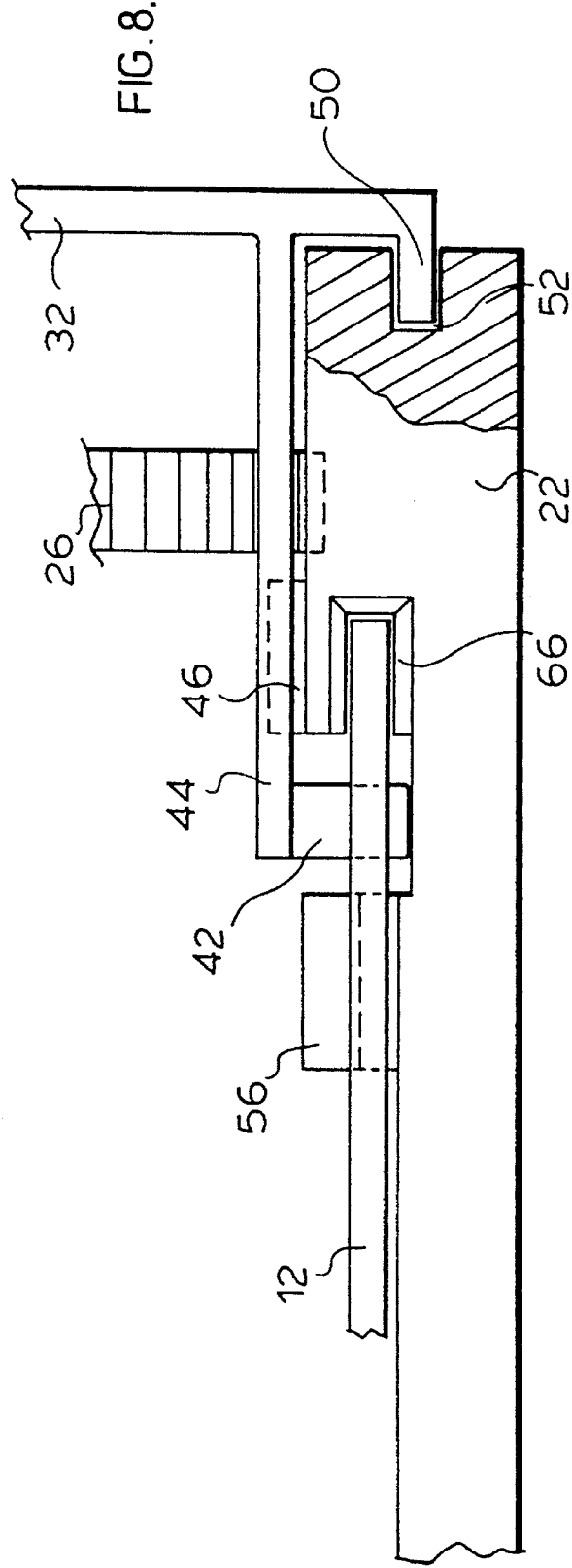

CARD READER WITH CARRIAGE POWERED BY MOVEMENT OF INSERTED CARD

FIELD OF THE INVENTION

The present invention relates to an interface of a card reader for reading information stored on a stripe of the card. In a preferred embodiment the interface also accommodates an IC reader/writer.

BACKGROUND OF THE INVENTION

Credit cards and debit cards normally have a magnetic stripe adjacent one edge thereof and this magnetic stripe stores certain information with respect to the card. Some of these cards also include an integrated circuit (IC) chip which is embedded in the plastic card. A card of this type is commonly referred to as a "Smart card". The integrated circuit allows for the storage of additional information and in addition to allowing reading of information contained in the chip, it also allows information to be written to the chip. In this way, the card can be updated.

There are a number of different arrangements for reading of magnetic stripe cards from manual readers to automated readers. Perhaps the most common reader is a "swipe" reader where the card is manually forced through a card slot past a magnetic read head. The motion of sliding or swiping the card past a magnetic read head allows the read head to read information contained on the magnetic stripe. Accurate reading of the information most commonly occurs when the card is guided at constant velocity past the read head or is moved past the read head without sudden changes. For example, the card can be accelerating past the read head and as long as the acceleration is generally smooth, accurate reading of the card can occur. Problems occur when there is a sudden change in the velocity or acceleration of the card.

To overcome the problems associated with "swipe" readers, a number of manual and motor-driven systems have been proposed. In such systems, the card is inserted into a slot to an operating position where the read head is driven along the magnetic stripe. Motorized arrangements include some sort of carriage or drive arrangement for moving the head relative to the stripe at essentially constant velocity for reading of information. These types of systems work well and the only major drawbacks are with respect to cost and higher maintenance due to the higher degree of mechanization.

A number of manual readers use some sort of spring biasing means having one end connected to a movable carriage and the other end of the spring connected to the support housing. Potential energy is developed in the spring as the carriage is moved from an initial position to a second position when the card is fully inserted into the device. The carriage is then released and moves over the card and along the magnetic stripe. These systems have not proven entirely satisfactory and are limited by the extent of relative movement of the carriage.

A further type of card reader is known as "a dip" reader. In this structure, the card is fully inserted into a slot and the reading step is carried out when the card is removed from the device. Some people believe it is easier to smoothly remove the card from the device rather than swipe it past a magnetic head. These type of readers suffer from the same problems as "swipe" readers.

Example of various card readers are disclosed in the following U.S. Pat. Nos. 4,833,310; 4,048,476; 4,423,320; 4,575,703; 3,976,858; 4,581,523; 3,940,796; 3,866,827; and, 4,529,872.

U.S. Pat. No. 4,529,872, in particular, describes a magnetic card reader for reading signals recorded on the magnetic stripe of a card. The reading head is mounted on a supporting body contained within a housing and the card is inserted through a slot in the housing to engage a stop on the supporting body. The stop and the supporting body are moved against the force of a spiral spring until the supporting body reaches an end position within the housing where the stop engages a counterstop to lower the stop beneath the magnetic card. The supporting body thereby is released for return movement in response to the force of the spring and the magnetic stripe on the card is read during the return movement.

SUMMARY OF THE INVENTION

The present invention is directed to a manual card reader which allows for the accurate reading of information contained on a stripe recording medium provided on a card.

The card reader according to the present invention is for reading information recorded on a stripe recording medium provided on a card. The reader comprises means for supporting the card for movement between the first position and a second position. A carriage engaging the card and movable therewith between the first position and the second position with the carriage including a drive arrangement. The drive arrangement has associated therewith an energy storage arrangement. The energy storage arrangement is carried by and moved with the carriage. The energy storage arrangement stores energy when a card moves the carriage from the first position to the second position and cooperates with the drive arrangement to use the stored energy to drive the said carriage under its own power from said second position to said first position when said carriage is released by an actuator means. The actuator means automatically releases the carriage when the carriage is moved by the card to the second position. The carriage includes a read head aligned with the stripe for moving therealong and reading thereof as the carriage is driven from the second position to the first position over the card.

With the above arrangement, the carriage includes an energy storage arrangement thereon that moves with the carriage. The users when he forces his card into the device generates certain potential energy which is stored in the energy storage arrangement. This energy is then used to drive the carriage from the second position to the first position.

According to a preferred aspect of the invention, the energy storage arrangement includes a torsion spring having one end held against rotation relative to the carriage and the other end attached to the drive arrangement. Movement of the carriage from the first position to the second position causes loading of the torsion spring in a manner to store energy which is used for driving of the carriage from the second position to the first position. By using a torsion spring with many windings, it is possible to preload the spring creating a bias force urging the carriage to the first position. Additional loading of the spring merely provides further energy and is within a very small region of the much larger operating range of the spring. For example, in the preferred embodiment, the torsion spring is loaded by approximately two rotations and this is very low compared to the maximum loading of the spring. Therefore, the force necessary to insert the card is substantially the same regardless of the position of the carriage and the bias force can be quite high. It can be seen with this arrangement that the fact that the spring is carried by the carriage and extends across the carriage, the device is not unduly dictated by the extent of movement of the carriage. For example, if you want additional loading you could just change the drive ratio between movement of the carriage and loading of the spring. This has been found to provide a highly reliable system which is not subject to breakdown and can readily deal with different factors such as increased frictional drag due to various cards or various conditions of the cards.

According to an aspect of the invention, the interface for reading data stored on a magnetic stripe card comprises a base having slidably mounted thereon a carriage assembly, the base being provided with at least one rack gear for engaging a complementary roller gear mounted on and rotatable with an axle of the carriage assembly. The axle is provided with a torsion spring biasing means having a first end connected to rotate with the roller gear and a second end held against rotation by the carriage assembly. The carriage assembly has a magnetic read head mounted thereon and further has a card engaging means for engaging the edge of a card inserted into the device. The insertion of a card in the device slidably moves the carriage assembly from an initial position against the biasing of the torsion spring towards a read start position. The base is provided with a card engaging means releasing means for releasing the card engaging means at said read start position from engagement with the edge of the card inserted into the device to allow the torsion spring to return the carriage assembly to its initial position and move the magnetic read head over the card to read the data stored in the magnetic stripe on the card.

In an aspect of the invention, the interface is also adapted for reading and writing Smart cards. The base is provided with a contact area to provide an electrical connection with the IC on the card when the card is inserted into the device.

In another aspect of the invention, there is provided a method for reading data stored in a magnetic stripe card. The method comprises providing an interface comprising a base having slidably mounted thereon a carriage assembly, the base being provided with at least one rack gear for engaging a complementary pinion roller gear mounted on the carriage assembly on an axle means for rotation therewith. The axle means is provided with a torsion spring biasing means having a first end connected in a manner to permit rotation with the roller gear and a second end connected to the carriage assembly. The carriage assembly has a magnetic read head mounted thereon and further has a card engaging means. The method involves inserting a magnetic stripe card into the interface such that the edge of the card engages the card engaging means, pushing the card into the interface against the card engaging means to slidably move the carriage assembly from its initial position against the biasing of the torsion spring biasing means, until the card engaging means contacts a card engaging means releasing means provided on the base for releasing the card engaging means from engagement with the edge of the card inserted into the device to allow the torsion spring biasing means to return the carriage assembly to its initial position and move the magnetic read head over the card to read the data stored in the magnetic stripe on the card.

BRIEF DESCRIPTION OF THE DRAWINGS

The above as well as other advantages and features of the present invention will be described in greater detail according to a preferred embodiment of the present invention in which:

FIG. 7 is a front elevation view of the interface of FIG. 2;

FIG. 8 is an enlargement of the front elevation view of FIG. 7;

DETAILED DESCRIPTION OF THE PREFERRED EMBODIMENTS

Figure 1:
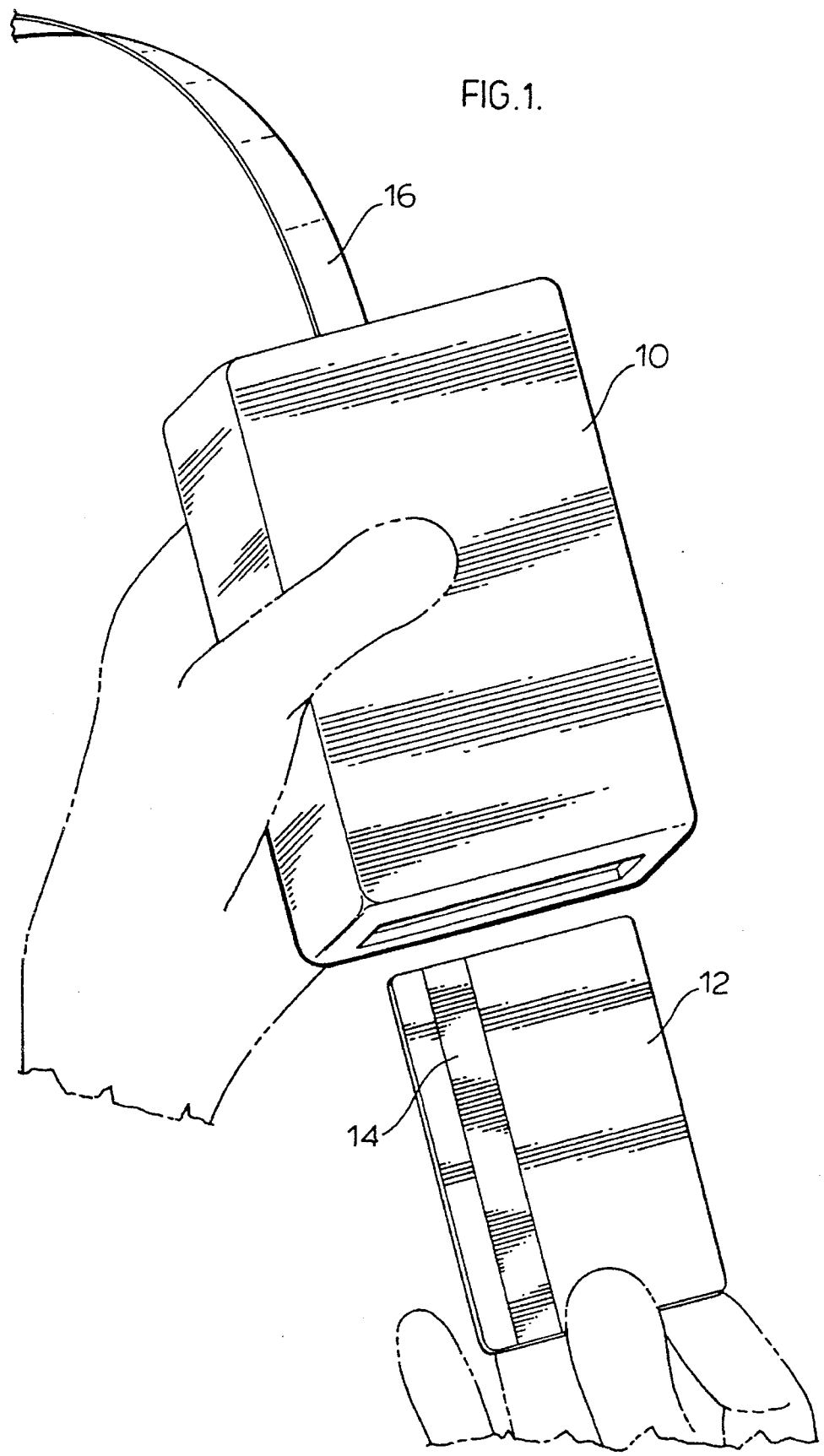
FIG. 1 is a perspective view of a card reader incorporating the interface of the present invention.

FIG. 1 illustrates a manually operated magnetic stripe reader shown at 10 incorporating the interface of the present invention. This interface can also be used for reading and writing to the IC of a Smart card. Reader 10 may be utilized for reading magnetic stripe cards 12. The card once inserted allows for both functions. Magnetic stripe cards 12 are provided with a magnetic stripe 14 having stored therein relevant information. The reader 10 reads the information on the magnetic stripe 14 and passes such information onto other devices (not shown) through the connecting cable 16. A Smart card typically has a magnetic stripe which is read by the interface as well as an IC for reading and writing information to the card. A separate electrical connection is made with the IC.

Figure 2:
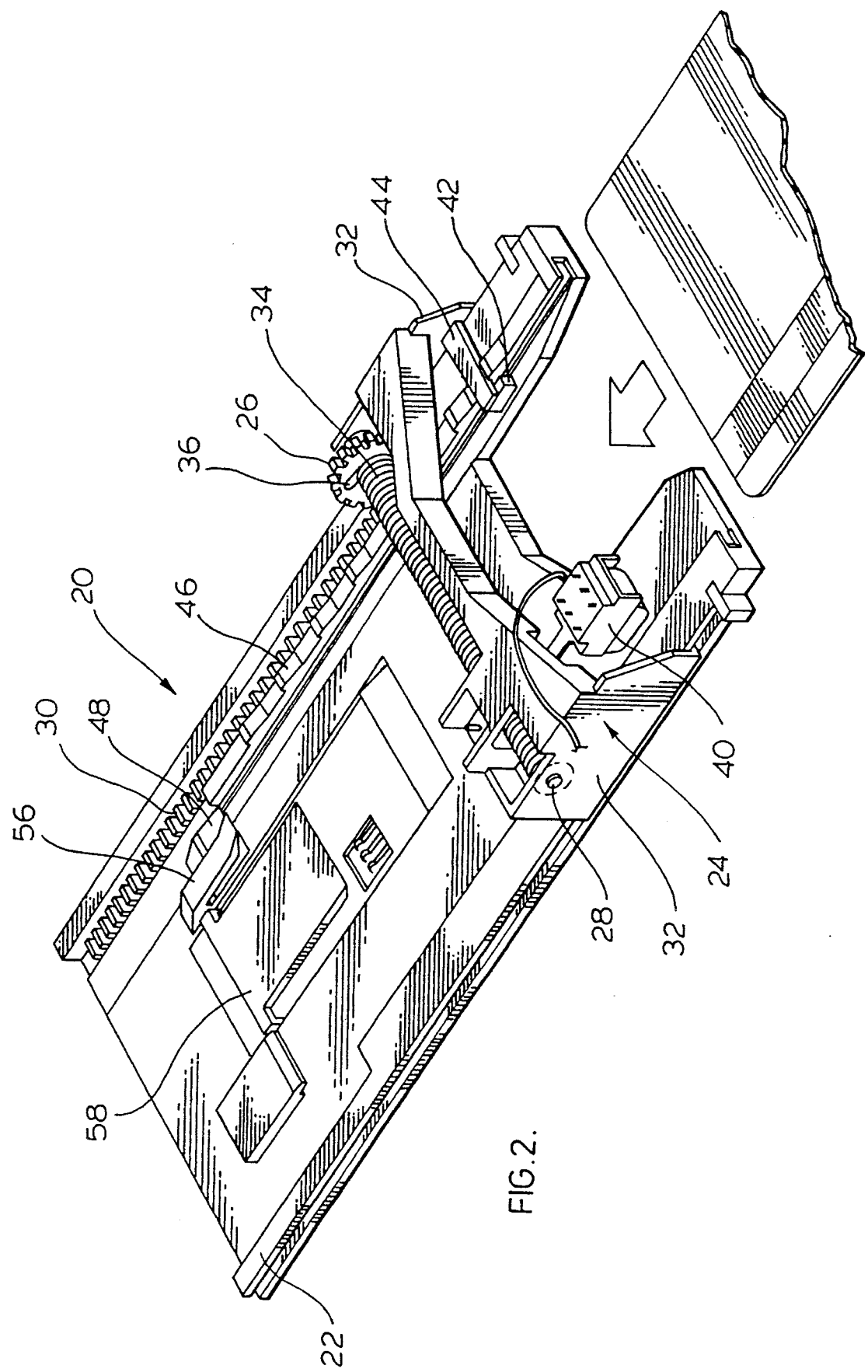
FIG. 2 is a perspective view of the card reader interface of the present invention.
Figure 3:
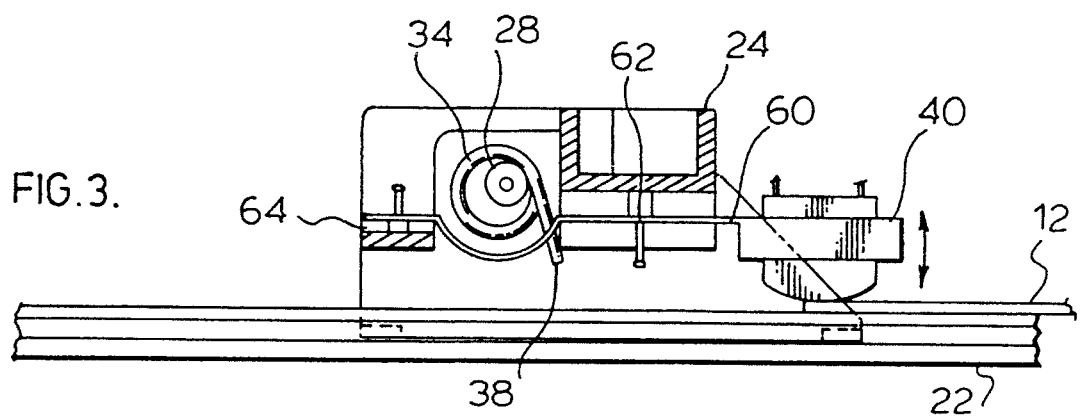
FIG. 3 is a cross section of the interface of FIG. 2 taken along line 3,3 of FIG. 2.
Figure 4:
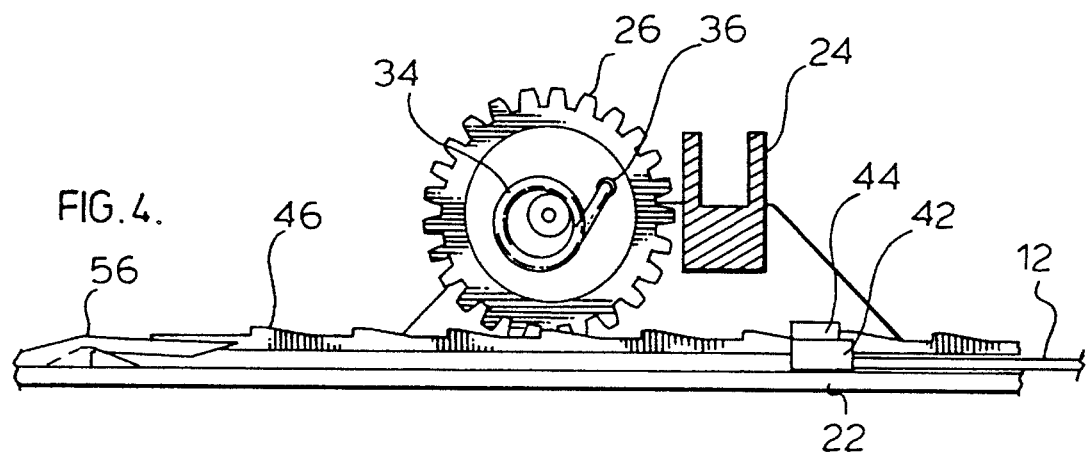
FIG. 4 is a cross section of the interface of FIG. 2 taken along line 4,4 of FIG. 2.
Figure 5:
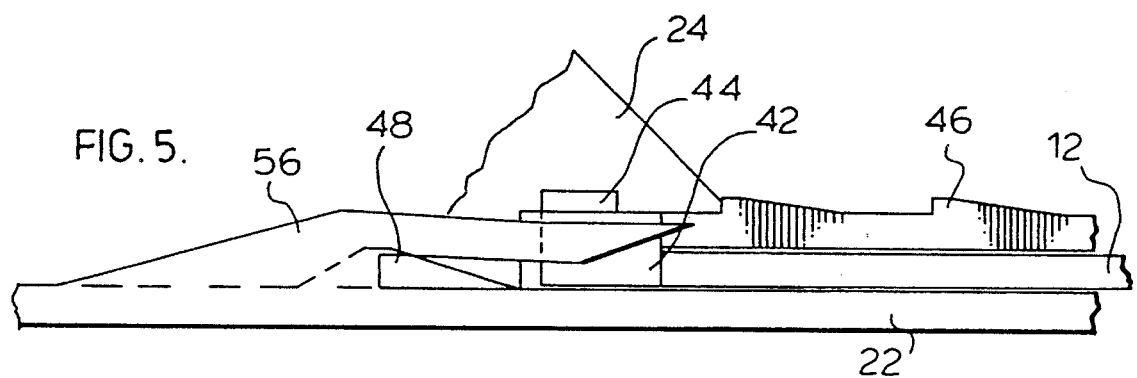
FIG. 5 is a close up side elevation view showing the details of the card gripping means of the interface of FIG. 2.
Figure 6:
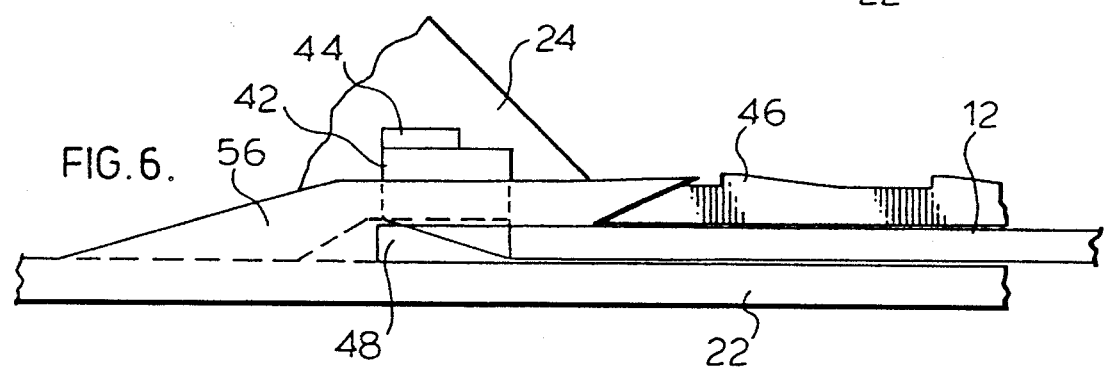
FIG. 6 is a close up side elevation view showing the details of the card gripping means of the interface of FIG. 2 in the action of gripping a card.

Details of the interface 20 and its operation are illustrated in FIGS. 2 though 11. Interface 20 has a base 22 on which is slidably mounted a carriage assembly 24. Carriage assembly 24 is provided with a roller gear 26 mounted on axle 28. Roller gear 26 is in meshing engagement with complementary rack gear 30 mounted on the base 22. The ends of the axle 28 are contained within ports in sides 32 of the carriage assembly 24. Roller gear 26 engages end 36 of the torsion spring 34 and causes a change in the windings 35 of the torsion spring when roller gear 26 rotates. The opposite end 38 of the torsion spring 34 is held in fixed engagement with the carriage assembly 24. Movement of the carriage causes a rotation of roller gear 26 and a change in the condition of the torsion spring 34.

Carriage assembly 24 has a magnetic read head 40 mounted in a proper position for reading the magnetic stripe 14 on a magnetic stripe card 12 which is inserted in the interface 20. Carriage assembly 24 is further provided with a card engaging means shown as stop 42 for engaging the edge of a card 12 inserted into the interface 20. Stop 42 is attached to the side 32 of the carriage assembly 24 by means of a flexible arm 44. This flexible arm 44 is positioned to ride along and be engaged by a series of ratchet teeth 46 provided on the base 22. Base 22 is also provided with a ramp 48 for releasing the carriage from drive engagement with a card.

Each side 32 of carriage assembly 24 is provided at a lower position with inwardly extending feet 50 which are retained in groove 52 provided each side of base 22. The feet basically float within the grooves 52 and guide the carriage during movement thereof. Carriage assembly 24 is slidably mounted on the base 22 by the feet 50 riding in the grooves 52 of the base 22. In order to prevent the carriage assembly 24 from disengaging from the base 22 during the return action, base 22 is provided with stops 54 at the front of the grooves 52 to limit the forward motion of the carriage assembly 24. Base 22 is also provided with a card gripping means 56 for gripping and holding the card when it is fully inserted into the interface 20 to a second position. Base 22 may also be provided with a contact area 58 for a Smart card located in an appropriate region for contacting the contacts on the Smart card when the card is inserted into the interface 20. Note the carriage is a truss-like structure which engages the sides of the base 22 leaving the upper and lower surfaces of the card accessible for connection with an IC of a Smart card. This can be important as not all IC's are located in the same place on a card.

The base is also provided with cam 73 for lifting of the read head 40 accommodated by its flexible spring arm 60. This allows the carriage to start to accelerate prior to the read head contacting the card. With this structure, jitter at the start of the sweep of the magnetic stripe is reduced.

Figure 9:
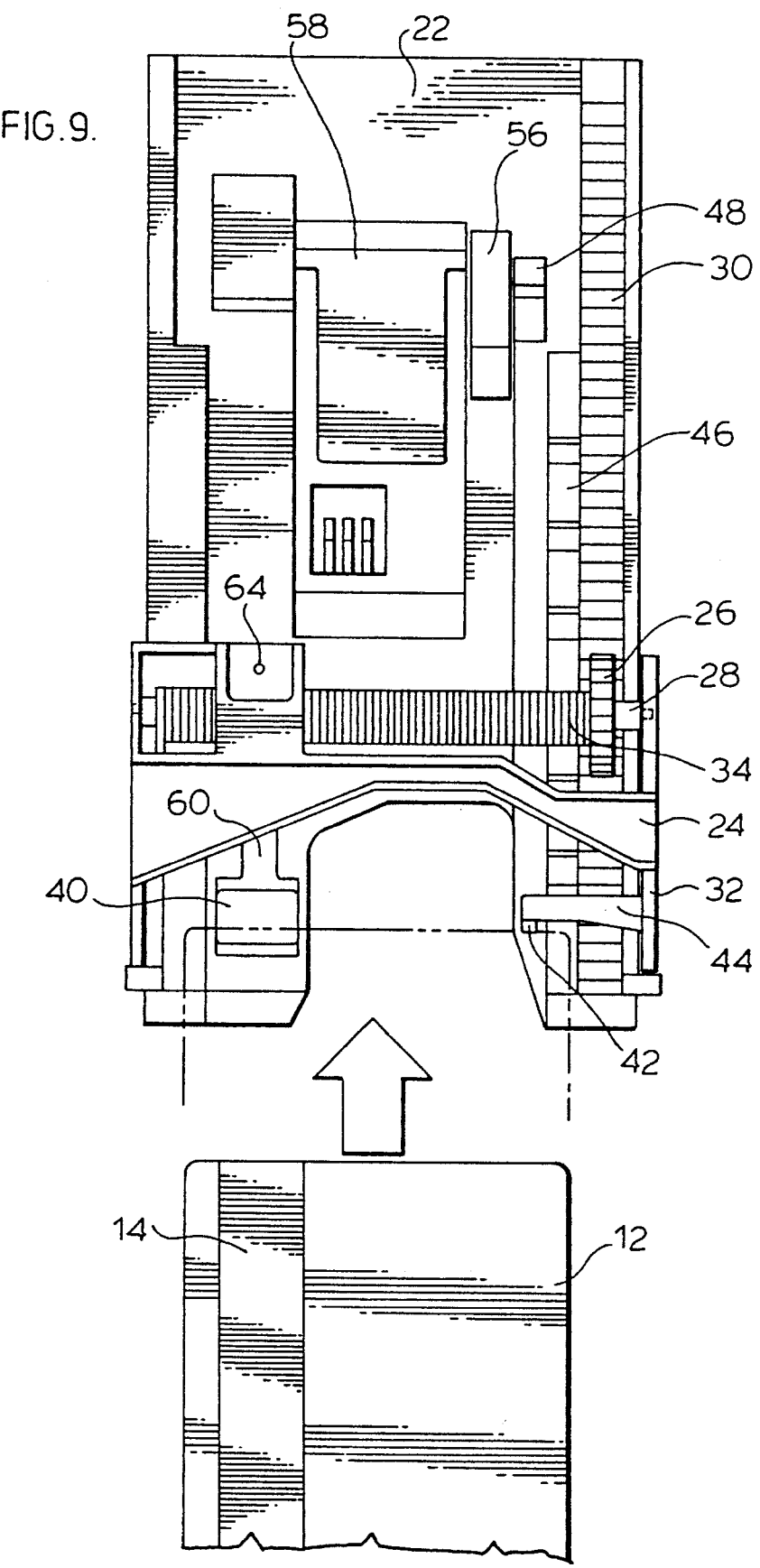
FIG. 9 is a top planar view of a card about to be entered into the interface of FIG. 2.
Figure 10:
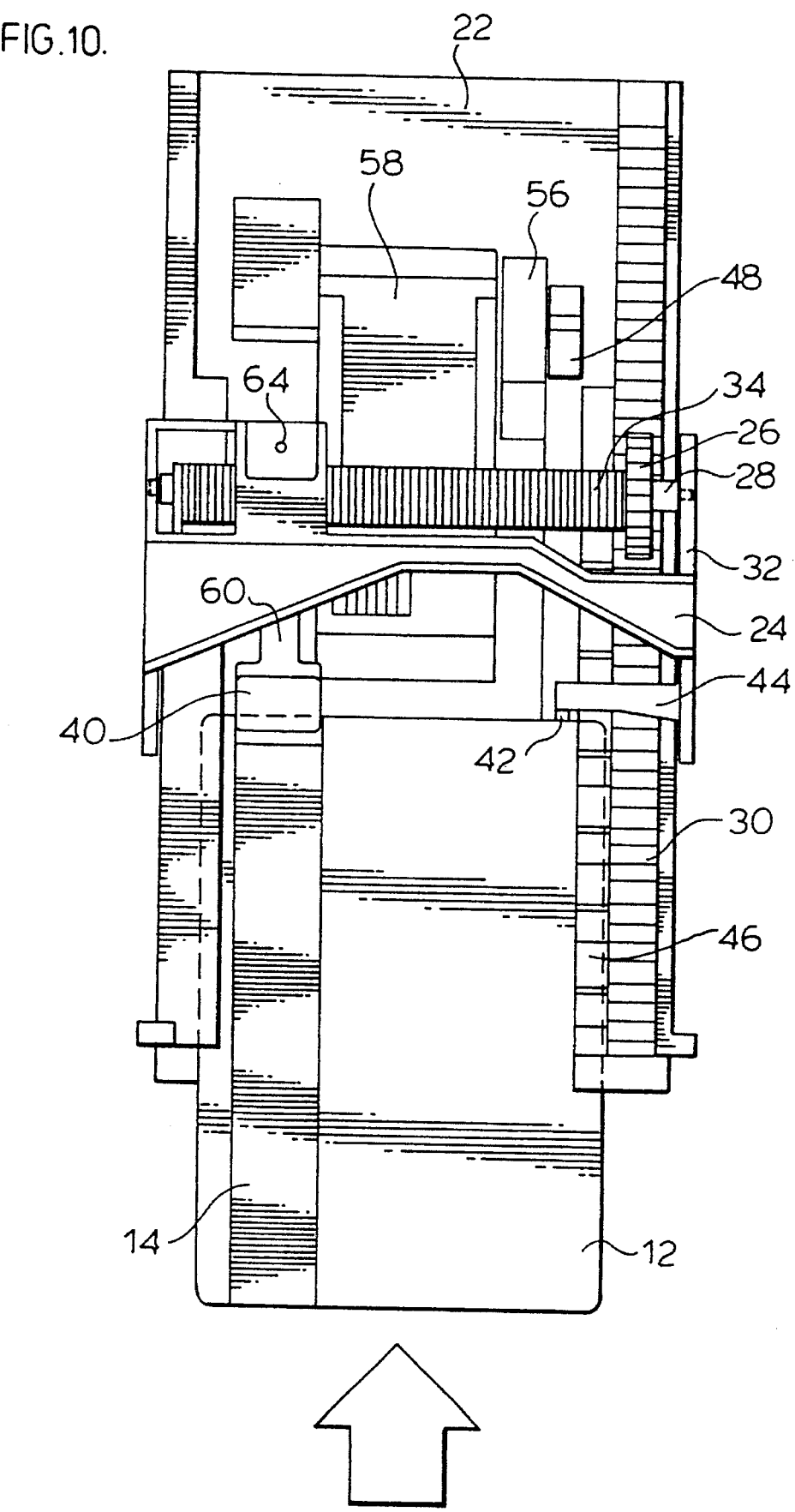
FIG. 10 is a top planar view of a card being inserted into the interface of FIG. 2.
Figure 11:
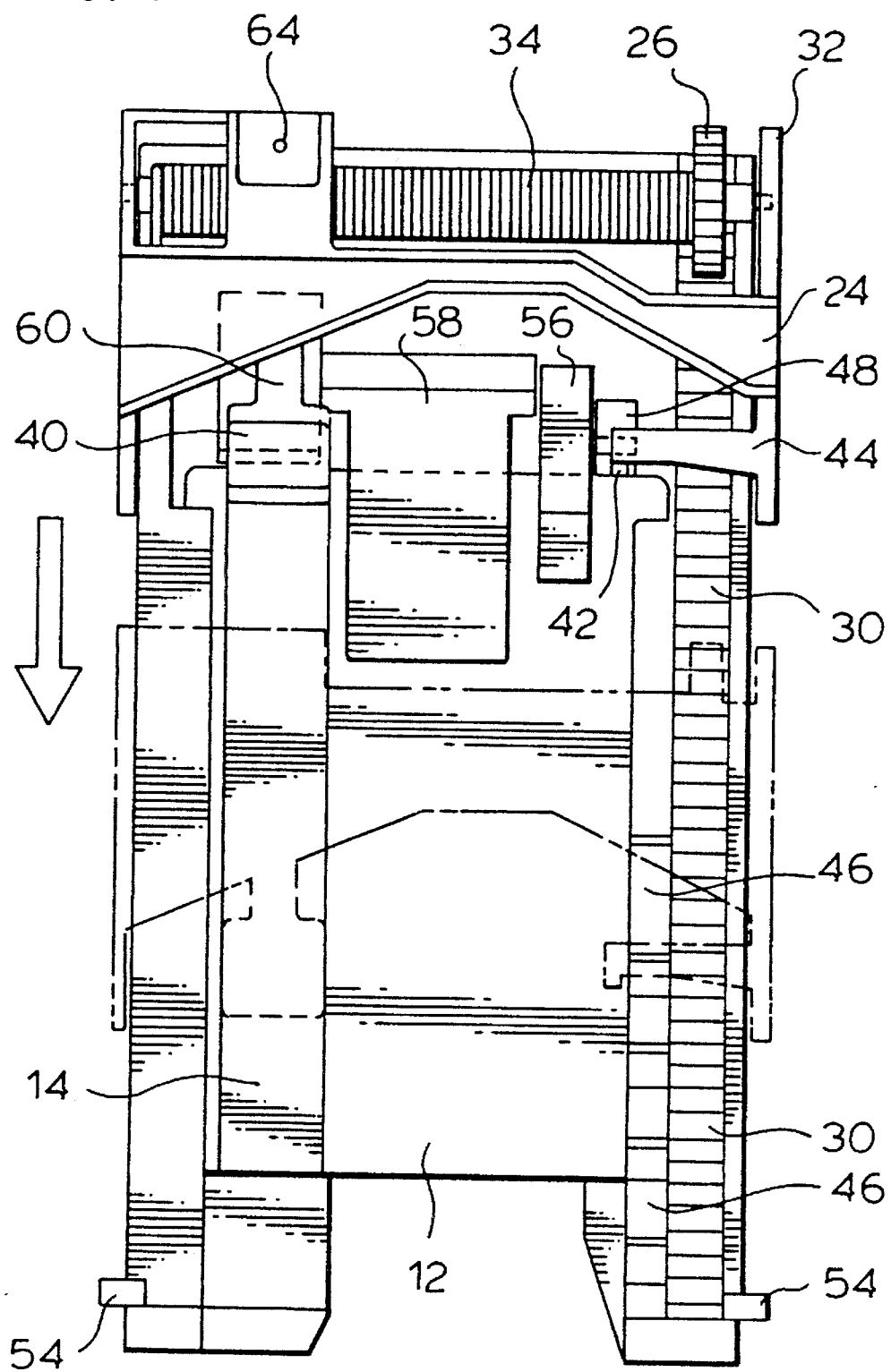
FIG. 11 is a top planar view of the interface of FIG. 2 with a card fully inserted into the interface.

In operation, as illustrated in FIGS. 2 and 9, the carriage assembly 24 is located at the front of the base 22 being held on the base by means of the complementary action of the feet 50 and the grooves 52 with the carriage assembly 24 resting against the stops 54 on the base. The torsion spring 34 is preloaded to maintain the positioning of the carriage assembly 24 in its initial position adjacent the card slot. The torsion spring 34 is designed such that in addition to being partially loaded when the carriage is in its initial position, the spring 34 operates within its linear range during the operation of the interface. The multiple winding torsion spring is further loaded by approximately two full rotations of the roller gear 26. The spring is preloaded in approximately four full rotations. The spring is easily operated in a range up to at least eight full rotations. Thus the spring is operating from a level of about 50 to 75 percent and this limited 25 percent is very predictable and linear. This renders the device very reliable and easily manufactured. The spring force easily moves the carriage assembly quickly and smoothly from the second position to the first position whereby an accurate read of the magnetic stripe is achieved.

When a magnetic stripe card 12 is inserted into the interface 20, the front edge of the card 12 initially contacts and partially slides under the read head prior to the card engaging stop 42 mounted on the carriage assembly 24. Magnetic read head 40 is attached to the carriage assembly 24 through a flexible spring arm 60 such that the head is cantilevered in front of the carriage assembly and slightly forward of the stop 42. This flexible arm 60 is attached to the carriage assembly 24 by a two-point attachment 62 and 64 such that the action of inserting the card 12 into the interface 20 pushes the magnetic read head 40 upwardly against the bias of the flexible arm 62. The read head 40 is positioned such that during the insertion of the card 12 into the interface 20, the front portion of the magnetic read head 40 is raised and rides on top of the front edge of the card. Although the card lifts the head up, the card does not go in far enough to cause the head to pick up any signal from the magnetic stripe. With this structure, pickup positions of the head are raised and do not contact the base during the insertion of the card into the slot and movement of the carriage from the initial to the second positions. The magnetic head is still positioned such that the pick-ups fully sweep the magnetic stripe when the carriage is released. In order to aid in the guiding of the card into the interface, the base 22 is provided with grooves or guides 66 to accept the edges of the card 12 while it is inserted into the interface. These grooves or guides 66 provide for proper positioning and alignment of the card 12 in the interface 20 for the read operation as well as allowing for some straightening of the card 12 if it is bent. As the card 12 is pushed into the interface 20, the card 12 contacts the card engaging stop 42 and forces the carriage assembly 24 to move with the card. This forced movement increases the loading of torsion spring 34 through the rotation of the end 36 of the spring 34 attached to the roller gear 26. Roller gear 26 rotates as the carriage is moved due to its meshing relationship with rack gear 30.

As the carriage assembly 24 is moved rearwardly by the insertion of the card 12, the flexible arm 44 rides along the ratchet teeth 47 rising slightly as the arm rides on the forward camming surface of each tooth 47 and then returning to the rest position as it drops over the stop on the ratchet tooth. In this way, should the user release the pressure forcing the card into the interface, the flexible arm will engage the stop of the adjacent ratchet tooth and prevent the carriage assembly from returning to the initial position. The provision of the ratchet teeth also aids in the insertion of the card in another way in that initially the user will typically grip the card between their thumb and forefinger to insert the card into the slot of the interface. However, depending upon the design of the reader, it may be difficult for the user to fully insert the card when it is gripped in this manner. By providing the teeth and flexible arm, which cooperate to hold the carriage assembly and card in an intermediate position, the user is able to release his grip on the card and reposition the grip to more easily push the card fully into the interface. When the card 12 is fully inserted into the interface 20, the card engaging stop 42 contacts the ramp 48 which causes the card engaging stop 42 and attached flexible arm 44 to be lifted upwardly thereby being released from engagement with the edge of the card 12 and the ratchet teeth 46 respectively. This arrangement defines an actuation structure that releases the carriage assembly and allows the carriage assembly 24 to be driven over the card. The carriage is driven to the initial position by the roller gear 26 which rotates under the influence of the loaded torsion spring 34 and meshing with the rack. During the return of the carriage assembly 24, the stop 42 slides along the upper surface of the card 12 maintaining the flexible arm 44 in a clear position above the ratchet teeth 46. During the return of the carriage assembly 24 to its initial position, magnetic read head 40 slides along the magnetic stripe 14 on the card 12 maintaining proper reading contact with the stripe 14 through the biasing of the flexible arm 60 thereby reading the information contained on the magnetic stripe 14. When the carriage assembly 24 returns to its initial position, the card 12 may be removed from the interface 20 ready to be used for other reads. Removal of card allows arm 60 to return to its original condition.

The interface 20 may also be utilized with Smart cards by incorporating an appropriate contact area 58 on the base 22 for providing electrical contact with the Smart card for reading and writing of the information contained on the IC chip of the Smart card. Typically contact is made as the card approaches the second position where the card is fully inserted in the slot. Contact interface 58 is provided with a card gripping guide 68 to grip the top surface of the card and a suitable contact 70 is made with the contact areas on the lower surface of Smart card. The gripping area 68 and contact 70 may be biased by means of springs (not shown) such that during the insertion of the card, the gripping region 68 and contact area 70 are biased rearwardly and upwardly to increase the contact force between the contact area 70 of the interface and the contact area of the Smart card.

The present invention provides for a simple manually operated card interface which significantly reduces the human factors known to cause reading errors. The interface is compact to allow the foot print of the reader to be small and/or allow more room for other components. This structure also allows good access to both top and bottom surfaces of a card for convenient electrical contact therewith.

The structure has been described with respect to a multiple wound torsion spring carried and supported by the carriage assembly. It can be appreciated that the torsion spring could be located in the housing and merely loaded and unloaded by a drive arrangement. For example, a cable attached to the carriage which rotates a drive attached to one end of the torsion spring. Such an arrangement would have the benefits of the torsion spring drive described herein, however, the structure is somewhat more complicated. The carriage assembly is relatively light and accelerates quickly when driven and is not damaged when it suddenly strikes stop 54.

Although various preferred embodiments of the present invention have been described herein in detail, it will be appreciated by those skilled in the art, that variations may be made thereto without departing from the spirit of the invention or the scope of the appended claims.

The embodiments of the invention in which an exclusive property or privilege is claimed are defined as follows:

1. An interface for reading data stored in a magnetic stripe card comprising a base having slidably mounted thereon a carriage assembly, the base being provided with at least one rack gear for engaging a complementary pinion roller gear mounted on the carriage assembly on an axle means for rotation therewith, the axle means being provided with a torsion spring biasing means having a first end connected in a manner to permit rotation with the roller gear and a second end held against rotation by the carriage assembly, the carriage assembly having a magnetic read head mounted thereon and further having a card engaging means for engaging the edge of a card inserted into the device, the insertion of a card in the device slidably moving the carriage assembly from an initial position against the biasing of the torsion spring biasing means, the base being provided with a card engaging means releasing means for releasing the card engaging means from engagement with the edge of a card inserted into the device to allow the torsion spring biasing means to return the carriage assembly to its initial position and move the magnetic read head over the card to read the data stored in a magnetic stripe on the card.

2. An interface as claimed in claim 1 adapted for reading and writing Smart cards wherein the base is provided with a contact area for making an electrical connection with an IC on an Smart card inserted into the device.

3. An interface as claimed in claim 2 wherein the card engaging means comprises a stop attached to the carriage assembly by means of a flexible arm.

4. An interface as claimed in claim 3 wherein the stop extends downwardly from the flexible arm.

5. An interface as claimed in claim 4 wherein the height of the stop is such that a card positioned in the interface contacts the stop intermediate its upper and lower ends.

6. An interface as claimed in claim 5 wherein the base is provided with a series of ratchet teeth for engaging the flexible arm of the card engaging means during insertion of a card into the interface.

7. An interface as claimed in claim 6 wherein the magnetic read head is attached to one end of a flexible arm and the second end of the flexible arm is attached to the carriage assembly by a two point attachment to permit biasing of the read head.

8. An interface as claimed in claim 6 wherein a card gripping means is provided on the base for gripping a card fully inserted into the interface to maintain the card in position during the return of the carriage assembly.

9. An interface as claimed in claim 6 wherein the card engaging means releasing means comprises a ramp for moving the stop and flexible arm upwardly to a position above the card to allow the stop to ride along the upper surface of the card during the return of the carriage assembly and maintain the flexible arm above and away from contact with the ratchet teeth on the base.

10. A card reader for reading information recorded on a stripe recording medium provided on a card, said reader comprising a means for supporting said card for movement between a first position and a second position, a carriage engaging the card and movable therewith between said first and second positions, said carriage including a drive arrangement having an associated energy storage arrangement, said energy storage arrangement being carried by and moving with said carriage, said energy storage arrangement storing energy when said card moves said carriage from said first position to said second position and cooperates with said drive arrangement to use said stored energy to drive said carriage under its own power from said second position to said first position when said carriage is released by an actuator means, said actuator means automatically releasing said carriage when said carriage is moved by a card to said second position, said carriage including a read head aligned with said stripe for moving therealong and reading thereof as said carriage is driven from said second position to said first position over said card.

11. A card reader as claimed in claim 10 wherein said energy storage arrangement is a torsion spring having a first end held against rotation by said carriage and an opposite end connected to said drive arrangement and rotatable therewith.

12. A card reader as claimed in claim 11 wherein the length of said torsion spring is substantially constant irrespective of the position of said carriage within said housing.

13. A card reader as claimed in claim 10 wherein said energy storage arrangement includes a wound spring and the number of windings of said spring varies as a function of the position of the carriage in said housing.

14. A card reader as claimed in claim 10 wherein said energy storage arrangement includes a spring which is orientated with the longitudinal axis thereof across said carriage.

15. A card reader as claimed in claim 10 wherein said drive arrangement includes a rotary member pivotally secured to said carriage and in engagement with said base to cause rotation of said rotary member with movement of said carriage between said positions.

16. A card reader as claimed in claim 15 wherein said rotary member is a gear and said base includes a rack which meshes with said gear.

17. A card reader as claimed in claim 10 wherein said carriage includes a stop arm biased to engage a longitudinal stop member which allows movement of said carriage from said first position to said second position while providing stops therebetween which engage said stop arm and limit return movement of said carriage, and wherein said stop arm is moved to a clear position once said carriage reaches said second position allowing free movement of said carriage from said second position to said first position.

18. A card reader as claimed in claim 17 wherein said stop arm is integral with said carriage.

19. A method of reading information recorded on a magnetic stripe of a card comprising using a card to move a carriage of a card reader from a first position to a second position, storing energy derived from moving said carriage from said first position to said second position, using said stored energy to power a drive member of said carriage to cause said carriage to be driven rapidly between said second position and said first position over a card therebelow and with a read head of said carriage aligned with the stripe to sweep the stripe as said carriage is driven between said second and said first positions.

20. A method as claimed in claim 19 wherein said step of storing energy includes changing the number of windings of a torsion spring by rotating one end of said torsion spring as said carriage is moved from said first to said second position.

21. A method as claimed in claim 20 wherein said drive is a rotary member rotatably mounted to said carriage and which rotates as said carriage is moved between said positions.

22. A method as claimed in claim 19 wherein said step of storing the energy stores said energy on said carriage.

23. In a card reader an interface for reading by means of a magnetic head information recorded on a magnetic stripe of a card, said interface comprising a housing with a card slot therein and a movable carriage having a magnetic read head thereon positioned relative to said card slot for alignment with the magnetic stripe of a card, said carriage being biased to move to an initial position adjacent said card slot when a card is not inserted in said slot and to move to a carriage release position when a card is fully inserted in said slot, said carriage including a drive member and associated energy storage arrangement which cooperate to store energy during movement of said carriage from said initial position to said carriage release position and use said stored energy to drive said carriage over said card to sweep said stripe in a predetermined manner between said carriage release position and said initial position.

* * * * *